United States Patent [19]

Zihlmann et al.

[11] Patent Number: 4,553,321
[45] Date of Patent: Nov. 19, 1985

[54] METHOD AND APPARATUS FOR THE AUTOMATIC PRODUCTION OF ARMATURES FOR ELECTRIC MOTORS

[75] Inventors: Siegfried Zihlmann, Wurenlos; Werner Streiff, Zurich, both of Switzerland

[73] Assignee: Micafil AG, Zurich, Switzerland

[21] Appl. No.: 568,071

[22] Filed: Jan. 4, 1984

[30] Foreign Application Priority Data

Aug. 22, 1983 [CH] Switzerland ............... 4557/83

[51] Int. Cl.⁴ .................................. H02K 15/09
[52] U.S. Cl. ............................... 29/598; 29/564.5; 29/733; 29/735; 198/341; 414/129; 414/744 R
[58] Field of Search ............... 29/564.1, 564.5, 598, 29/732, 733, 735, 736; 198/341; 414/129, 744 R

[56] References Cited

U.S. PATENT DOCUMENTS

| | | | |
|---|---|---|---|
| 3,920,129 | 11/1975 | le Vasseur | 214/1 Q |
| 4,012,834 | 3/1977 | le Vasseur | 29/736 X |
| 4,087,054 | 5/1978 | Finegold | 242/7.05 B |
| 4,106,185 | 8/1978 | Lauer | 29/736 X |
| 4,296,543 | 10/1981 | Hamane et al. | 29/5.96 |

Primary Examiner—Howard N. Goldberg
Assistant Examiner—Timothy V. Eley
Attorney, Agent, or Firm—Burns, Doane, Swecker & Mathis

[57] ABSTRACT

A method and apparatus for the production of armatures for small electric motors is provided wherein the armatures are clamped in specially designed workpiece holders and continuously processed in successive work stations. The stations may include an armature loading station, a collector pressure-fitting station, a winding station, a welding station, an electrical testing station and an armature discharge station. The transportation of the workpiece holders through the apparatus is effected by a revolving conveyor belt which moves the workpiece holders individually or in groups to the successive work stations. At each work station, the workpiece holder is raised from the conveyor belt, secured in the work station, and connected by clutch devices to corresponding actuating devices within the work station.

12 Claims, 10 Drawing Figures

METHOD AND APPARATUS FOR THE AUTOMATIC PRODUCTION OF ARMATURES FOR ELECTRIC MOTORS

BACKGROUND OF THE INVENTION

A. Field of the Invention

The present invention relates to a method and apparatus for the automatic production of armatures for small electric motors. More specifically, the present invention relates to a method and apparatus in which armatures for small electric motors are continuously produced in a production line assembly.

B. State of the Prior Art

In some armature manufacturing devices, it is possible to wind several armatures simultaneously with the feed and the winding being affected automatically. One form of such a machine is an automatic turntable winding machine used in combination with an automatic or semi-automatic ancillary installation. Other embodiments of armature manufacturing devices are disclosed in U.S. Pat. Nos. 3,920,129 and 3,980,184 in which the armatures are not only wound but also welded, balanced, electrically tested and thus completely finished on a transfer line in a single working cycle.

In all of the manufacturing installations heretofore, the individual devices for processing the armature represent individual units with the work being transported to and removed from the unit by feeder installations after each individual processing step. Storage facilities are also required between the individual processing units. The use of individual processing units requires the intermittent starting and stopping of the equipment which may introduce sources of errors into the system. In addition, a significant disadvantage of these systems is that they require ancillary installations such as the feeder installations and the storage facilities which are relatively expensive and space consuming.

OBJECTS AND SUMMARY OF THE INVENTION

An object of the invention is to provide a method and apparatus for the automatic production of armatures in which an arbitrary number of independent processing stations are provided.

A further object of the present invention is to provide a method and apparatus for the automatic production of armatures which do not require installations for the feeding or the storing of the armatures between the stations.

Another object of the invention is to provide a method and apparatus in which armatures are clamped into a workpiece holder in an armature charging station and remain clamped therein during the entire manufacturing process in all the stations.

A further object of the present invention is to provide a method and apparatus for the production of armatures in which the armatures are rapidly passed to completion without the need for intermediate storage.

It is a further object of the present invention to provide a method and apparatus for the production of armatures in which losses of time and sources of error are reduced while increasing the efficiency of the manufacturing process.

An additional object of the invention is to provide an apparatus for the production of armatures which is relatively inexpensive and which conserves space.

The foregoing and other objects and advantages are provided according to the present invention through the provision of an apparatus for the automatic production of armatures for electric motors in a cyclic system that successively processes the armatures in individual stations which operate independently of each other. The apparatus includes a production line having a revolving conveyor means for transporting at least one workpiece holder along the production line in a direction of transport. A plurality of individual processing stations are successively located along the production line for the successive processing of the armatures. The processing stations include an armature loading station for clamping an armature into the workpiece holder, a collector press-on station for attaching a collector to the armature, a winding station for winding wire about the armature, a welding station for welding the wire on the armature, a testing station for electrically testing the armature, and an armature discharge station for removing the armature from the workpiece.

The workpiece is transported by the conveyor means to the individual stations. At each station, the workpiece holder is arrested and lifted with respect to the conveyor means and then secured and connected to the individual station by a coupler device on the workpiece holder. The coupler device cooperates with an actuating device in each processing station for actuating the processing of the armature in that station.

The present invention also relates to a process for automatically producing armatures for electric motors in a cyclic system that successively processes an armature in individual stations. According to the process, at least one workpiece holder is transported by a revolving conveyor to the individual stations located along the conveyor. The workpiece holder is positioned and secured into each individual station in order to process an armature clamped within the workpiece holder. The processing of the armature is actuated by connecting a connecting device arranged on a hollow shaft on the workpiece with an actuating device in each individual station. After processing the armature in all the stations and then releasing the armature from the workpiece holder, the workpiece holder is returned by the conveyor to receive another armature for processing.

BRIEF DESCRIPTION OF THE DRAWINGS

A preferred embodiment of the present invention will be described in detail with respect to the accompanying drawings wherein like elements bear like reference numerals and wherein:

FIG. 1' is a top view of the overall apparatus of FIG. 1;

FIG. 2' is a top view of the workpiece holder of FIG. 2;

DETAILED DESCRIPTION OF A PREFERRED EMBODIMENT

Figure 1:
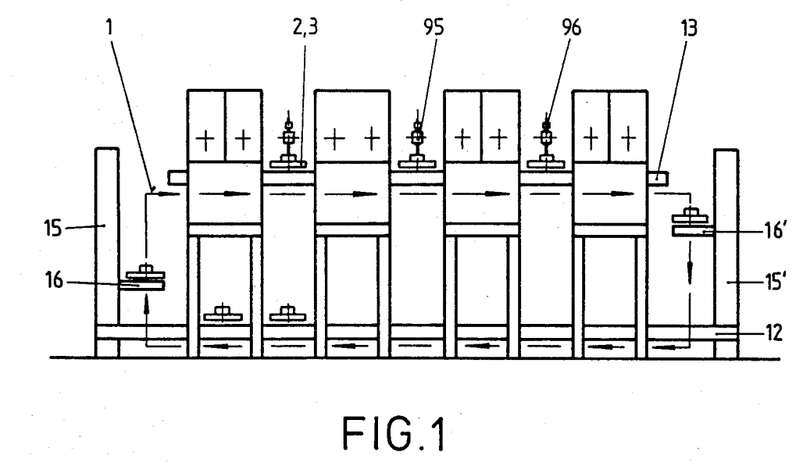
FIG. 1 is a side elevational view of the overall apparatus.

In the overall view of the apparatus illustrated in FIGS. 1 and 1', a transportation system 1 has workpiece holders 2, 3 which hold an armature 95 to be processed. The workpiece holders 2, 3 are moved individually or in groups in two planes on a conveyor mechanism within the system 1. In an upper working plane, a conveyor belt 13 is in line with successive stations which process the armature. In a preferred embodiment, the stations (FIG. 1') include an armature charging station 4, collector press-on stations 5, 6, winding stations 7, 7', welding stations 8, 8', a testing station 9 and an armature discharge station 4'. Generally, armatures 95 without windings and collectors are transported on a roll conveyor 17 to the charging station 4 of the apparatus and the finished armatures are transported from the discharge station 4' by a further roll conveyor 17' for further processing. A second transport belt 12 is arranged in a lower plane of the apparatus for returning the empty workpiece holders 2, 3 to the charging station 4. The conveyor belts 12, 13 are connected to each other by raising and lowering installations 15, 15' equipped with carriers 16, 16'.

As noted, the workpiece holders 2, 3 may be moved individually or in groups through the systems. In a preferred embodiment, a pair of workpiece holders 2, 3 are moved through the system which therefore includes a pair of collector press-on stations 5, 6, a pair of winding stations 7, 7', and a pair of welding stations 8, 8'. Only one member of each pair of workpiece holders or stations will be described in the following. In addition, identical elements performing the same function in all the stations are provided with the same reference symbol with the function of the element not being described repeatedly at each successive station.

Figure 2:
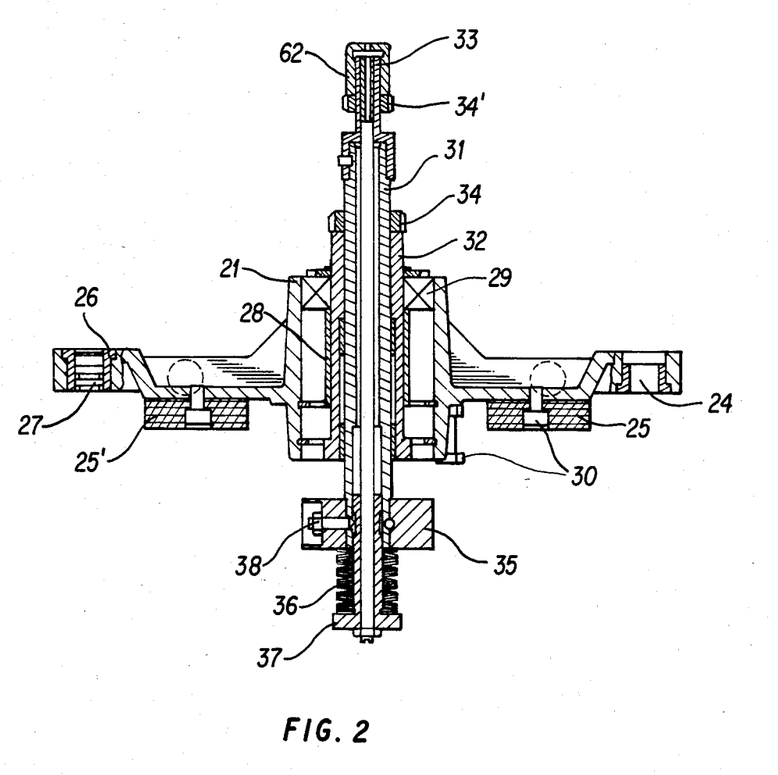
FIG. 2 is a cross-sectional view of a workpiece holder used in the apparatus of FIG. 1.

With reference to FIGS. 2 and 2', the workpiece holder 2, 3 includes a support 21 with guide plates 25, 25' fastened thereto by screws 30. A hollow shaft 32 centrally extends in roller bearings 29 through the support 21 in a direction perpendicular to the direction of transport. The height of the shaft is fixed in the support 21 by a groove nut 34. A spacing sleeve 28 is arranged between upper and lower roller bearings 29. An upper end of the hollow shaft 31 has a collet chuck 33 and a holding sleeve 62 which is fastened to the hollow shaft 31 by a further groove nut 34'. The lower end of the hollow shaft 31 is provided with a coupling device which connects to an actuating device on each station. In a preferred embodiment, the coupling device includes a coupling piece 35 which is fastened with screws 38 to the hollow shaft 31. A spring plate 37 is arranged at the base of the hollow shaft and springs 36 are provided between the coupling piece 35 and the spring plate 37.

The support 21 has clamping surfaces 22, 22' (FIG. 2') which are oriented in the direction of transport. Positioning bushes 24, 24' are arranged in diagonal corners of the clamping surfaces 22, 22' for the workpiece holder 2, 3. An indexing bolt 27 for the detection of possible defects acts in an indexing bush 26 arranged on one of the clamping surfaces 22, 22'. Buffers 39 are provided on the front surface of the support 21.

Figure 3:
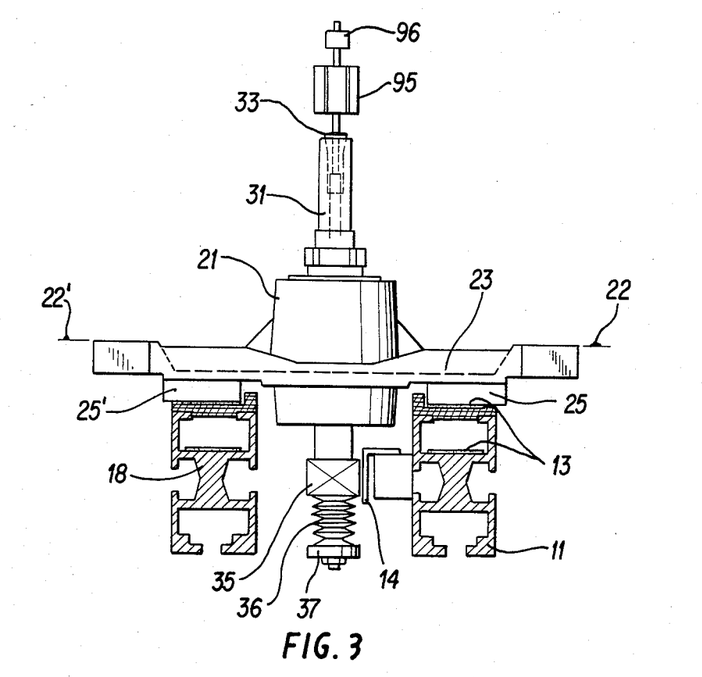
FIG. 3 is a side elevational view of the workpiece holder cooperating with a conveyor belt (shown in cross-section)

FIG. 3 illustrates the workpiece holder 2, 3 with an armature 95 clamped therein. A hook collector 96 has been pressure fitted within the armature. For the sake of clarity, the holding sleeve 62 shown in FIG. 2 is omitted. The guide plates 25, 25' of the workpiece holder 2, 3 are supported on the conveyor belt 13. The conveyor belt 13 is supported by a belt guide 11 which may be provided with different mechanisms 18 for fastening it to the apparatus. A clutch guide bearing 14 is arranged on the inside of the belt guide 11. The clutch guide 14 prevents the axial rotation of the coupling piece 35 of the workpiece holder 2, 3 and thereby prevents the axial rotation of the hollow shaft 31 with the armature 95 clamped in the collet chuck 33. The surface of the support surrounding the hollow shaft 31 may have the configuration of a container 23 so that wire residues from the armature can be collected.

Figure 4:
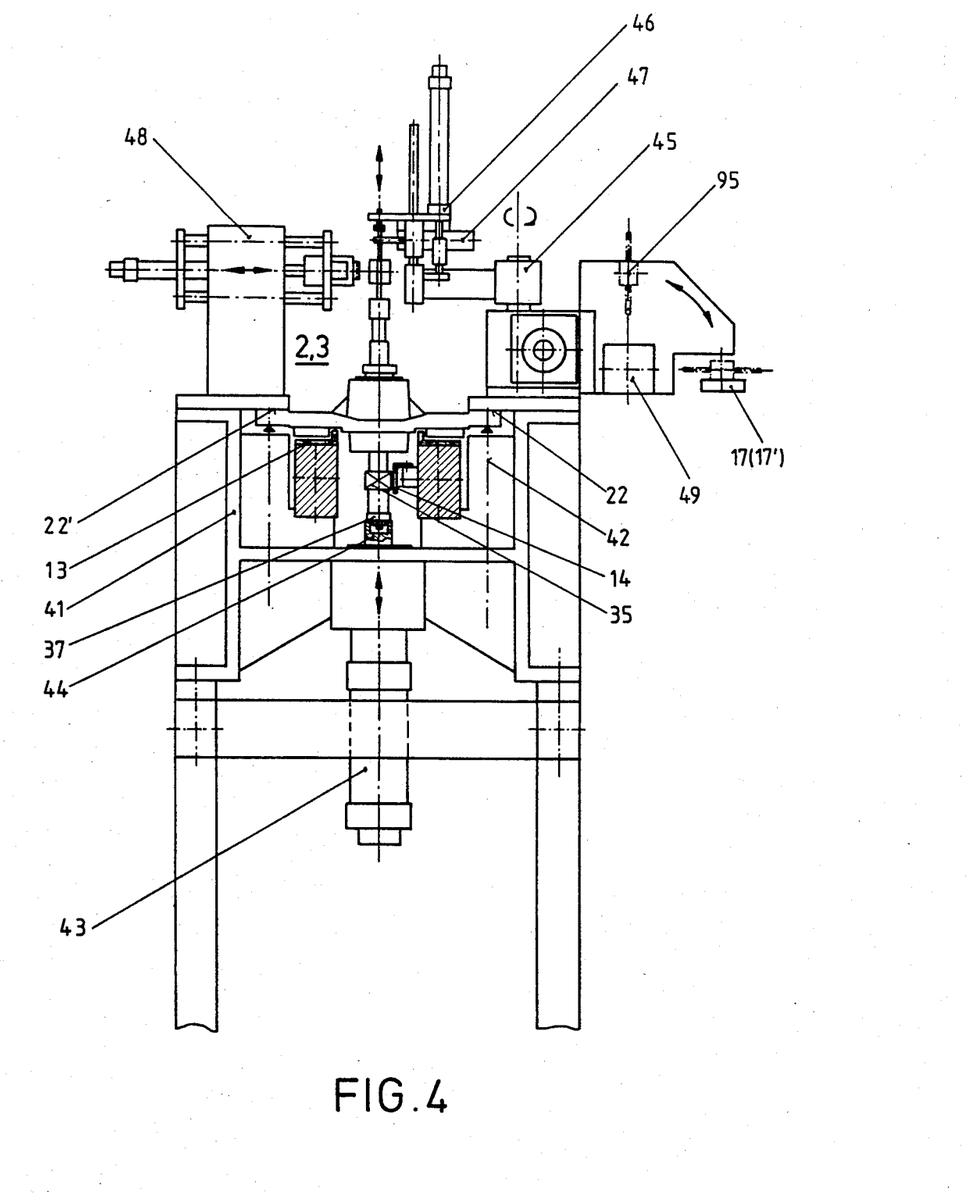
FIG. 4 is a longitudinal cross-sectional view through an armature charging or discharge station.

The armature charging station 4 is illustrated in FIG. 4. It is noted that the armature charging station 4 and the armature discharge station 4' are generally identical, and therefore only the charging station 4 will be described. The armature charging station 4 includes a support 41 and an actuating mechanism such as a pressure piece 44 which acts vertically in a cylinder 43 to open the collet chuck 33. More specifically, the pressure piece 44 acts on the spring plate 37 of the coupling device to open the collet chuck 33 of the workpiece holder. It is noted that the workpiece holder 2, 3 with the clamping surfaces 22, 22' are raised with respect to the conveyor belt 13 by positioning holding bolts 42, 42' engaging the positioning bushings 24, 24' in the clamping surfaces 22, 22' of the workpiece holder.

In operation of the clamping station 4, a collectorless armature 95 travels over the roller conveyor 17 to the armature charging station 4. To load the armature onto the collet chuck 33 of the workpiece holder 2, 3, an armature separating device 49 cooperates with a slide 46 and a pivoting arm 45 having a grip 47. An aligning device 48 is arranged to align the armature 95 in the workpiece holder.

Figure 5:
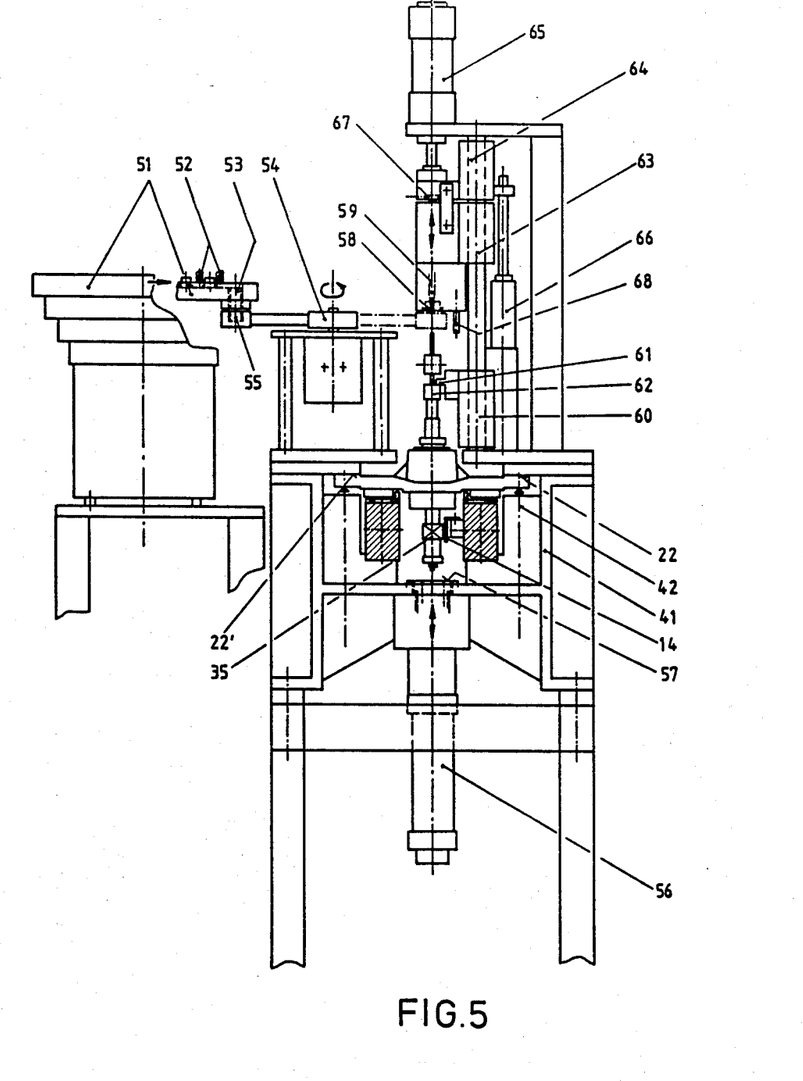
FIG. 5 is a longitudinal cross-sectional view through a collector press-on station.

FIG. 5 illustrates the collector press-on stations 5, 6 that function in cooperation with a helical and longitudinal vibrator 51 which is not described in detail. The press-on stations 5, 6 have a support 41 and an actuating device which includes a cylinder 56 and a pressure piece 57 to hold the coupling piece 35 of the workpiece holder 2, 3. The workpiece holder 2, 3 is raised from the conveyor belt 13 as described in connection with the armature charging device 4 by the position holding bolts, only one 42 being shown engaging the position bushings 24, 24'.

In operation of the press-on station 5, 6, the collectors 96 are introduced from the helical and longitudinal vibrator 51 and arrive through a collector separating device 52 and an alignment holder 53 in a holding device of a pivot arm 54. To introduce the collector 96 into the collector press-on station 5, 6, the collector 96 is set on a further press-on holder 58 and a shell mandrel 59. Lower and upper press-on slides 63, 64 are also provided in the collector press-on station. To secure the collector 96 on the axle of the armature 95, a spacing stop 68 is supported on a supporting slide 60 and a projection 61 of the support slide 60 supports a receiving sleeve 62. To press the collector 96 onto the armature axle, a cylinder/piston unit 65 with a pressure force monitoring device is provided along with a brake cylinder 66. In a preferred embodiment, the pressure force monitoring device may be based on the principle of strain gauges.

Figure 6:
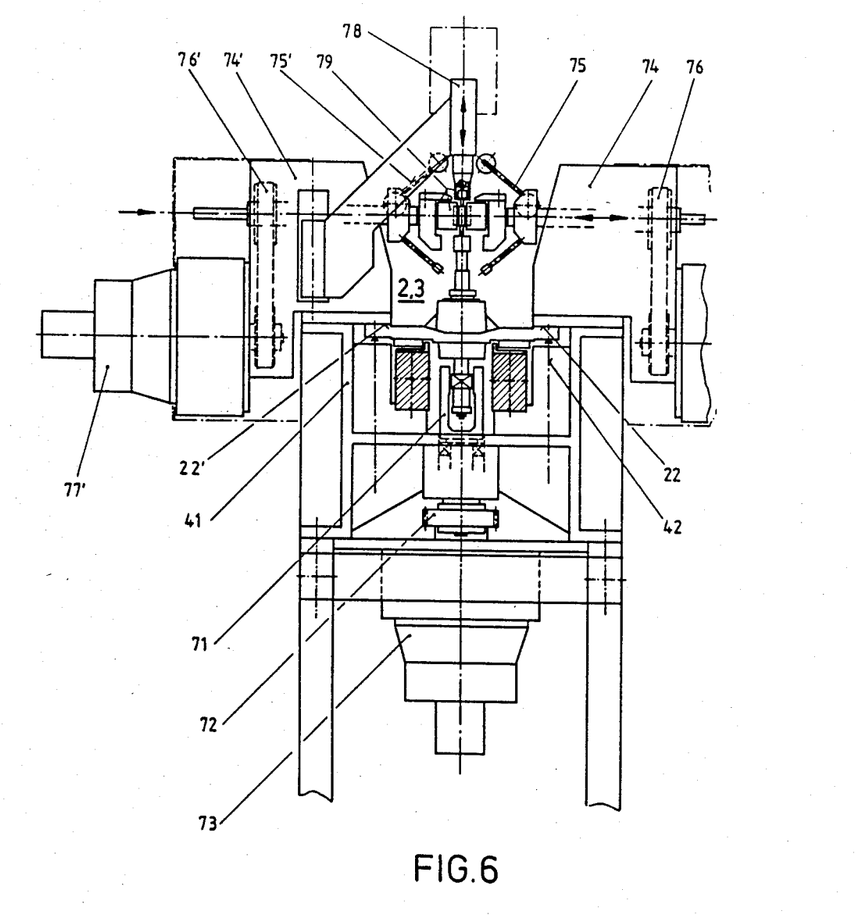
FIG. 6 is a longitudinal cross-sectional view through a winding station.

In FIG. 6, the winding stations 7, 7' are illustrated. The actuating device for the winding stations, only one 71 being shown preferably includes a d.c. motor 73 with clutch shafts 71, 71' and drive gear 72. The d.c. motor 73 is preferably equipped with four quadrant velocity and position controls. In a manner similar to the preceding stations, the workpiece holder 2, 3 is raised from the conveyor belt 13 and held in the winding position. The winding stations 7, 7' include two winding supports 74, 74' with winding shafts 75, 75' having winding arms mounted thereon. A toothed belt 76, 76' and winding drives 77, 77' are also provided. A vertically displaceable trailer unit 78 may be provided and contains armature supports, guide and cover sleeves and wire clamps. Other winding tools 79 including winding jars and guide fingers are mounted on the winding shafts 75, 75'.

Figure 7:
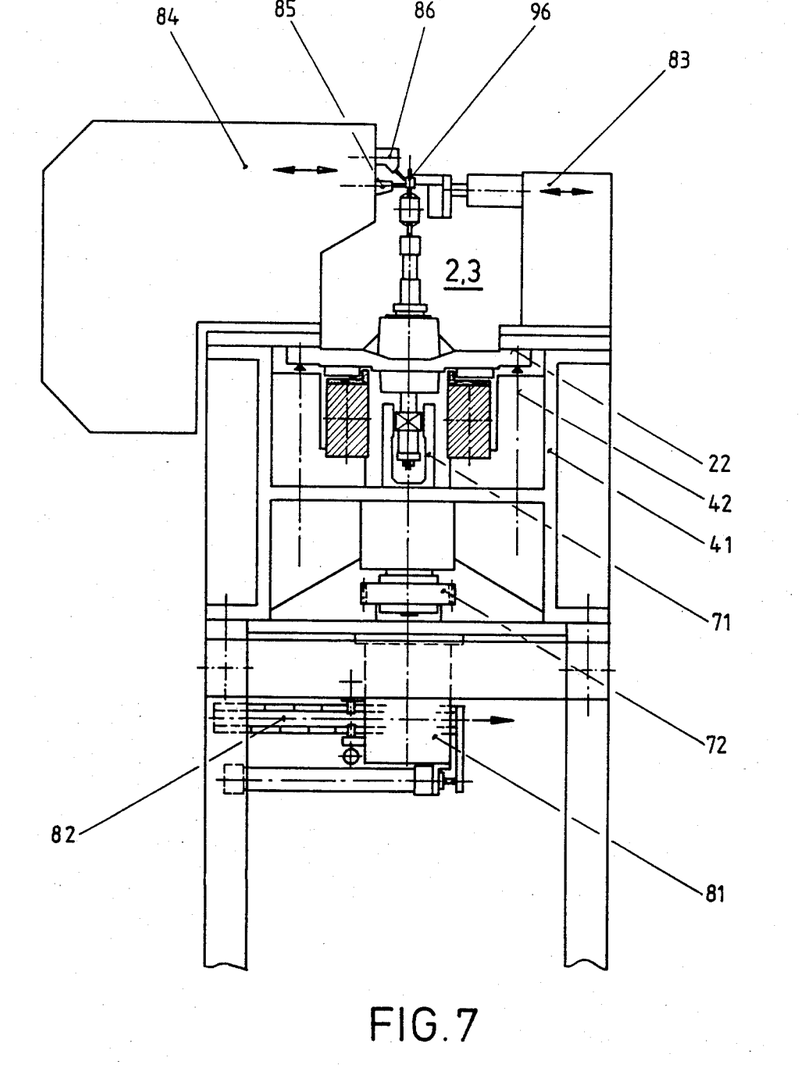
FIG. 7 is a longitudinal cross-sectional view through a welding station.
Figure 8:
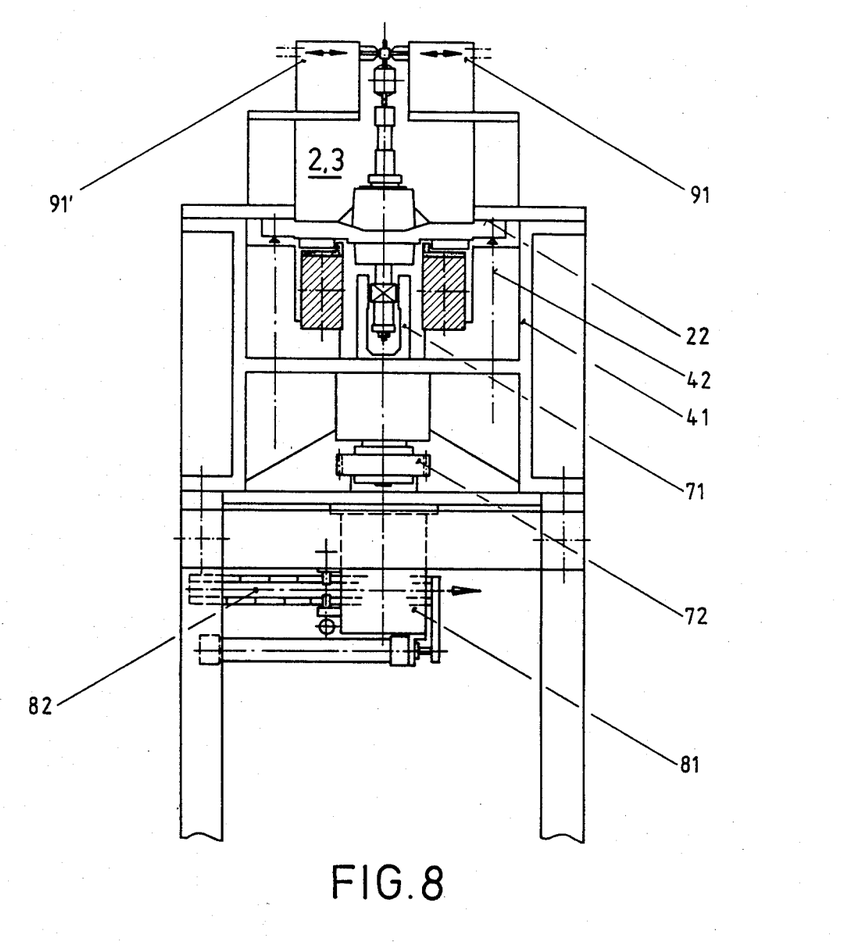
FIG. 8 is a longitudinal cross-sectional view through a testing station.

The welding station 8 and the testing station 9 according to FIGS. 7 and 8 are similar to each other in their configuration. The workpiece holders 2, 3 are lifted from the conveyor belt 13 and secured and held in their work positions as in the previous stations described hereinabove. The actuating drives are preferably pneumatic and include the clutch shafts only one 71 being shown, drive gear 72, a pneumatic cylinder 81 and controls 82. During the welding (FIG. 7), supports 83 are provided to absorb the contact pressures of a welding head 85 and grounding electrodes 86. The testing station 9 (FIG. 8) has contacting devices 91, 91' for electrical testing.

In operation of the inventive apparatus, the workpiece holders 2, 3 are transported individually and/or in groups by the revolving conveyor belt 13 into the subsequent, successively arranged work stations 4, 5, 6, 7, 7', 8, 8', 9, 4'. In each work station, the workpiece holders 2, 3 are raised from the conveyor belt 13 by the positioning and holding devices. After raising the workpieces into the corresponding working positions, the workpiece holder is connected with the individual actuating device for each station. Following the completion of the working process, the workpiece holders 2, 3 are lowered onto the conveyor belt 13 for transportation to the next work station.

In one cycle of operation, the empty workpiece holders 2, 3 are transported by the conveyor belt 13 to the armature charging station 4. Simultaneously, the roll conveyor 17 introduces the semi-finished collectorless armatures to the charging station 4. The armatures 95 introduced into the armature charging station 4 are taken by the armature separating device 49 in the grip 47 of the pivot arm 45. The armatures are placed into the open collet chuck 33 arranged on the upper end of the hollow shaft 31 of the workpiece holder 2, 3. The armatures 95 are then aligned in the grooves and clamped.

The workpiece holders 2, 3 with the armatures 95 clamped therein are lowered onto the conveyor belt 13 and moved into the working position at the collector press-on station 5, 6. The helicoidal vibrator 51 aligns the collectors 96 in the collector separating device 52 and the holder 53. The collectors 96 are moved by the pivot arm 54 into the press-on stations 5, 6 and then pressured into the armature axle of the armature 95 which is clamped in the workpiece holder 2, 3.

The workpiece holders 2, 3 with the collector armatures 95, 96 are then transported in pairs to the winding stations 7, 7'. After being raised to the winding position, the workpiece holders 2, 3 are engaged to the d.c. motor actuating drive device via the clutch shafts, only one 71 being shown to wind the armatures. After the winding is completed, the two workpiece holders 2, 3 are simultaneously moved by the conveyor belt 13 to the welding stations 8, 8'. The pneumatic actuating drives are connected to the welding stations after the workpieces are lifted from the conveyor belt 13. The winding wires are joined by welding to the collector hook 96. The workpiece holders 2, 3 are then transported individually to the testing station 9 where the collector armature 95, 96 is tested for electrical defects. After the completion of the testing, the finished collector armatures 95, 96 are removed from the workpiece holders 2, 3 in the armature discharge station 4' and the empty workpiece holders 2, 3 are transported by the second conveyor belt 12 back to the armature charging station 4 to begin a subsequent cycle.

The defect detection device provided in the workpiece holders 2, 3 permits the inspection of the workpieces at every work step in each work station. In this manner, defective armatures passing through the device may be detected and placed onto a rejection conveyor.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. An apparatus for the automatic production of armatures for electric motors in a cycling system for successively processing said armatures in individual stations independently of each other, the apparatus comprising:

a production line having a revolving conveyor means for transporting at least one workpiece holder along said production line in a direction of transport;

a plurality of processing stations successively located along said production line for successively processing said armature, said plurality of processing stations including an armature loading station for clamping an armature into said at least one workpiece holder, a collector press-on station located successively downstream of said armature loading station for attaching a collector to said armature, a winding station located successively downstream of said collector press-on station for winding wire about said armature, a welding station located successively downstream of said winding station for welding said wire on said armature, an electrical testing station located successively downstream of said welding station for electrically testing said armature, and an armature discharge station located successively downstream of said electrical testing station for removing said armature from said at least one workpiece holder;

said workpiece holder being transported by the conveyor means to the individual stations, said workpiece holder being arrested and lifted with respect to the conveyor means at each of said plurality of stations, and being secured and connected to the individual station by a coupler device on the workpiece holder, and an actuating device in each of said processing stations which in conjunction with the coupler device causes manipulations of the workpiece holder.

2. The apparatus recited in claim 1, wherein the workpiece holder includes guide plates with a support arranged thereon and a hollow shaft centrally extending in roller bearings within said support, said hollow shaft being oriented perpendicularly to the direction of transport and being equipped at an upper end with a collet chuck for clamping the armature and at a lower end with said coupler device for connection to said actuating device at a processing station.

3. The apparatus recited in claim 1, wherein the coupler device on the workpiece holder includes a coupler piece fastened to the hollow shaft, a spring plate arranged on said hollow shaft below said coupler piece and a spring arranged between the spring plate and the coupler piece.

4. The apparatus recited in claim 3, wherein the collector press-on station includes a support device for maintaining the coupler piece of the coupler device in the workpiece, said support device including a cylinder and a pressure piece displaceable with respect to a front surface of the coupler piece.

5. The apparatus recited in claim 3, wherein the welding station and the testing station each include an actuating drive which engages the coupler piece of the coupler device to actuate the hollow shaft, said actuating drive including a pneumatic cylinder acting on a control, a gear drive connected to the actuating drive and a clutch shaft engaged by said gear drive.

6. The apparatus recited in claim 1, wherein the workpiece holder is equipped with clamping surfaces arranged in a plane parallel to the direction of transport, each clamping surface being provided with a positioning bush, the bushes being arranged in diagonal corners of the clamping surfaces, the workpiece holder being lifted from the conveyor means and secured to a processing station by positioning bolts which engage the positioning bushes.

7. The apparatus recited in claim 1, wherein the armature loading station includes a pivot arm arranged over an armature separating device, the pivot arm having a slide adjustable in height and a grip, and an actuating device that includes a cylinder and a pressure piece, the actuating device engaging the coupling device on the workpiece holder.

8. The apparatus recited in claim 1, wherein the collector press-on station includes a collector separating device for receiving a collector, a first shaped holder for aligning the collector in the separating device, and a pivot arm equipped with a second holder for grasping and placing the collector in an insertion mandrel for insertion of the collector into the armature.

9. The apparatus recited in claim 6, wherein the collector press-on station further includes a spacing stop supported on a supporting slide and a projection of said supporting slide rests on a receiving sleeve.

10. The apparatus recited in claim 1, wherein the winding station includes an actuating drive for rotating the armatures clamped in the workpiece holder, said actuating drive including a d.c. motor, a drive gear engaged by said motor and clutch shafts connected to said drive gear.

11. The apparatus recited in claim 1, wherein the welding station includes a movable support which is displaceable with respect to a circumferential surface of a collector, said support compensating for a contact pressure of a welding head on said collector.

12. A processing for automatically producing armatures for electric motors in a cyclic system for successively processing an armature in individual stations, the process including the steps of:
transporting at least one workpiece holder by a revolving conveyor through the individual stations;
positioning and securing the workpiece holder in each individual station for processing said armature;
connecting a connecting device arranged on a hollow shaft of the workpiece holder with an actuating device in each individual station so that the armature can be processed in each individual station, the steps of processing including clamping the workpiece in an armature loading station, pressure fitting the armature with a collector in a collector press-on station, winding with wire in a winding station, welding in a welding station, electrically testing the armature in an electric testing station, and removing the armature from the workpiece holder in a discharge station so that said workpiece holder can be transported back to said armature loading station by said conveyor.

* * * * *